S. Puffer,
Scythe
No. 680
Patented April 7. 1838.
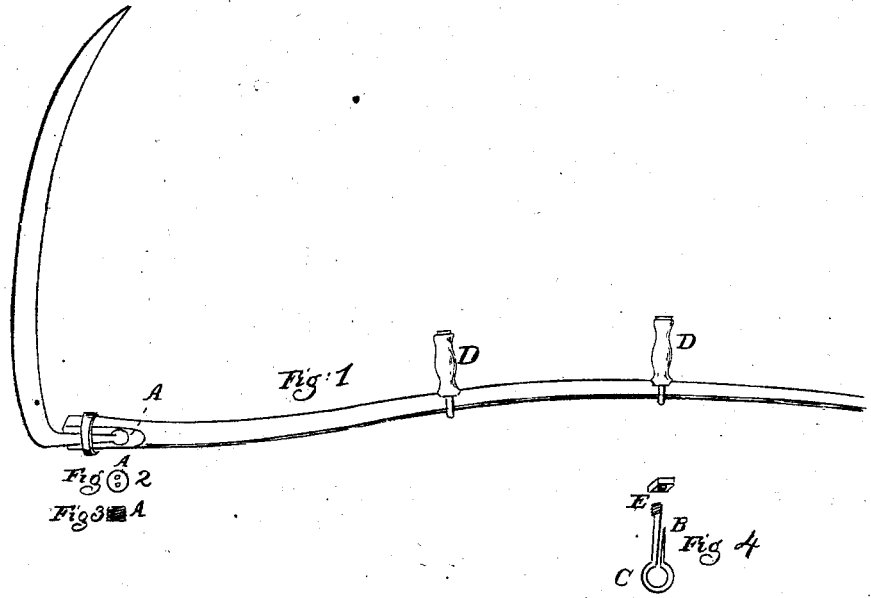

UNITED STATES PATENT OFFICE.

SAMUEL PUFFER, JR., OF SUNDERLAND, MASSACHUSETTS.

IMPROVEMENT IN SCYTHE-SNATHS.

Specification forming part of Letters Patent No. 680, dated April 7, 1838.

*To all whom it may concern:*

Be it known that I, SAMUEL PUFFER, Jr., of Sunderland, Franklin county, State of Massachusetts, have invented a new and useful Improvement in the Scythe-Snath, which is described as follows, reference being had to the annexed drawing of the same, making part of this specification.

The nature of this improvement consists in cutting a thread, A, Figure 3, in the periphery of a circular plate or bush, A, Figs. 1, 2, 3, let into the snath and making two apertures in the same for the shank of the scythe, so that it may be turned and fixed in any desired position, in order to set the scythe at any required angle, according to the kind of grass or grain to be cut, or the kind of land on which the mowing takes place, the shank being shifted from one aperture to the other, or the circular plate or bush turned as may be required. Likewise, in having one end, B, of the hook C, Fig. 4, of each nib D detached from the other, so that as the nut on the end of the longer arm, E, is turned it causes the two arms of the hook to be crowded into the perforation through the center of the nib and the hook to embrace and take a firm hold of the snath; by which improvements the cost of the snath is greatly reduced and a new and better effect produced by the scythe in mowing, as will be evident to the farmer on the first trial, for it is well known that heretofore he has been obliged to take off the scythe and bend the shank inward in order to set it at a proper angle for cutting lodge-grass, or on uneven and stony land, and to remove it again and bend it back to set it for cutting smooth grass, on even land, which bending is not only troublesome, but soon causes the shank to break. Besides, the scythe can never be set to that nicety by bending as by the before-described revolving bush.

What I claim as my invention, and which I desire to secure by Letters Patent, consists—

1. In the before-described revolving bush or circular plate for changing the angle of the scythe for cutting various kinds of grass or grain on various kinds of ground.

2. In detaching one end of the hook of the nib from the other to cause it to embrace the snath more firmly by crowding it into the aperture of the nib by the nut on the end of the longer arm of the hook.

SAMUEL PUFFER, JR.

Witnesses:
WM. P. ELLIOT,
EDMUND MAHER.